Feb. 10, 1953         E. J. MASTNEY         2,628,292
ELECTRICAL APPARATUS
Filed Aug. 12, 1950

INVENTOR.
Edward J. Mastney.
BY
Robert L. Kahn

Patented Feb. 10, 1953

2,628,292

UNITED STATES PATENT OFFICE 2,628,292

ELECTRICAL APPARATUS

Edward J. Mastney, Berwyn, Ill., assignor to Oak Mfg. Co., Chicago, Ill., a corporation of Illinois Application August 12, 1950, Serial No. 179,073

2 Claims. (Cl. 200—15)

This invention relates to an electrical apparatus and particularly to a rotary switch of the general type disclosed and claimed in United States Patents 2,186,949 and 2,186,950. Rotary switches of this type have flat rotor contacts movable in their own plane cooperating with fixed spring contacts having jaws embracing the rotary contacts on opposite sides thereof.

When the stator contact jaws are free of a rotor contact blade, the spring of the jaws should be enough to cause the jaws to touch each other. Hence when a rotor contact blade is present, the stator contact jaws grip the rotor contact blade firmly to make good contact. The mass of the stator contact is usually small so that the contact jaws become quite hot during soldering of leads to the stator contact. When the contact jaws are in non-contacting position i. e. the jaws touch each other, the heating of the jaws is harmless. However, if the jaws are in contacting position, the heating of the jaws may draw the temper of the metal and cause faulty contacting.

This objection can be met in many switches by turning the rotor to a position where the particular stator contact being soldered is in a non-contacting position. In some instances it may be possible to remove the rotor from the stator in a switch section.

Switch sections of the above general type are manufactured to specification as to rotor and stator contacts and forwarded to a customer who solders the switch sections into the system where the switch is used. In certain instances, the switch specifications are such that the rotor can not be removed and no dead stator contact position is possible with conventional construction.

This invention provides a construction for a rotary switch section of the type disclosed above where the possibility of damage to the stator jaws during soldering is eliminated.

Figures 1, 2:
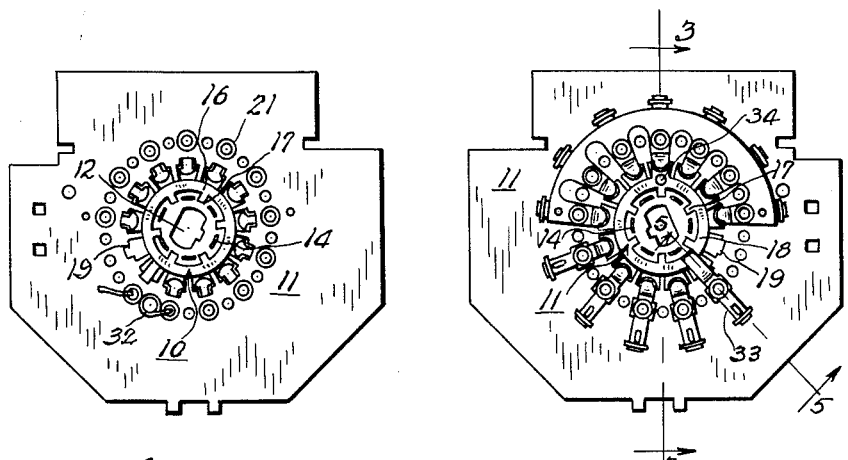
Figures 3, 4, 5:
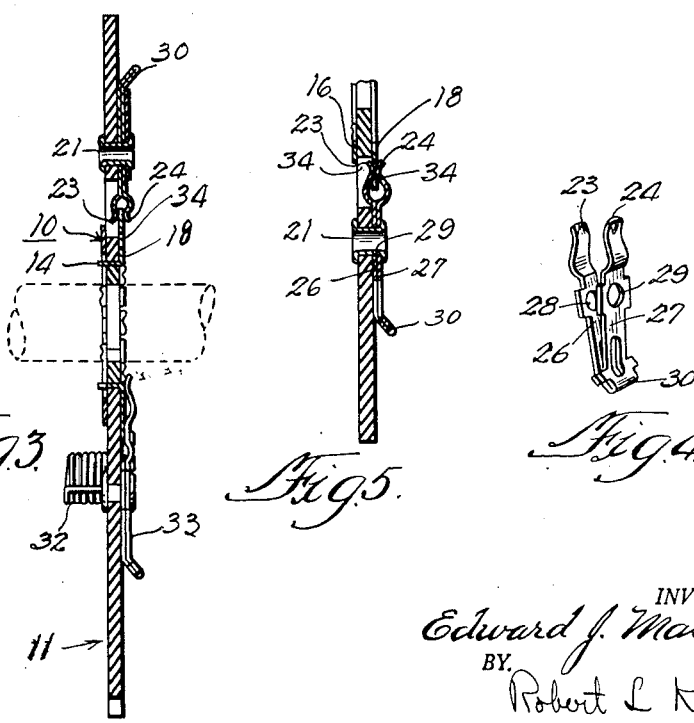

In order that the invention will be understood, it will be explained in the drawings wherein Figure 1 is a side elevation of a switch section embodying the present invention. Figure 2 is a side elevation of the reverse base of the switch section. Figure 3 is a section along broken line 3—3 of Figure 2. Figure 4 is a perspective detail of a stator contact and Figure 5 is a sectional detail on line 5 of Figure 2.

Referring to the drawings, the switch section comprises rotor 10 and stator 11 of suitable insulating material. Rotor 10 has a central portion cut out at 12 to provide an opening for accommodating a shaft. Rotor 10 may be one or more circular discs having spaced arcuate slots 14 disposed along a circle concentric with the rotor.

Carried by rotor disc 10 on the side thereof is rotor contact 16 which may be in one continuous ring or broken up into sections as desired. Rotor contact 16 has its inner edge beyond slots 14 and the rotor contact itself is carried on the rotor disc by having tongues 17 extend inwardly from the rotor contact to engage mounting slots 14. This general construction is fully disclosed in the patents referred to above.

On the reverse side of rotor disc 10 there may be one or more additional rotor contacts 18 which may extend completely around to form a ring or may be broken off at any particular desired spot. As is well understood and as is fully explained in said patents, the rotor contacts extend beyond the edge of the rotor disc itself and overlie certain parts of stator 11.

Stator 11 has slots 19 formed therein at regular intervals around the rotor disc. The stator carries any desired number of stator contacts, these contacts being secured by eyelets 21 disposed circularly around the rotor. Each stator contact consists of jaws 23 and 24 suitably shaped to provide a smooth contact action against the opposite sides of a rotor contact. Jaws 23 and 24 are carried by body portions 26 and 27 of the stator contact, these body portions having suitable apertures 28 and 29 for mounting with an eyelet. Body portions 26 and 27 carry lug portion 30 for soldering to one or more wires. When used for television, for example, many of the stator contacts have soldered thereto fine inductors or coils 32 suitably designed to provide desired circuit constants.

The stator contact shown in Figure 4 is normally shaped so that when eyeletted in position jaws 23 and 24 tend to touch each other. Thus firm contact on opposite sides of a rotor contact is maintained. In many instances, the switch section such as shown in Figures 1 and 2 is fabricated for use at some future time. Such switch sections have the rotor and stator so designed that the rotor cannot be removed from the stator and at least one contact such as for example 33 in Figure 2 always has its jaws on opposite sides of a rotor contact in all rotor positions. Such a stator contact may, for example, be used for a ground or common return.

When soldering parts to contact 33 for example, with the jaws slightly open, as would be the case because of the presence of the rotor contact, heat from the soldering iron would have a tendency to loosen the spring tension or action of the jaws and thus impair the contact action. To this end there is provided opening 34 in the rotor contact, this opening being so disposed that it may lie between the jaws of contact 33. The size of opening 34 is such that jaws 23 and 24 of the contact may touch each other just as if there were no rotor contact present. When the rotor is thus positioned, soldering of connections to contact 33 may be accomplished with the assurance that the contact action of the jaws on the rotor in all normal switch positions will be satisfactory.

Opening 34 in the rotor contact is so proportioned with respect to the opposing stator contact jaws as to just accommodate the active parts of the jaws. As shown, only the central parts of the stator contact jaws are active so that aperture 34 need not be too large.

In certain instances where the rotor contact may be thick, it will be necessary to provide a recess in the rotor contact rather than an aperture.

What is claimed is:

1. A rotary switch section having a rotor disc of insulating material, a stator of insulating material having an opening in which said rotor disc lies, flat contacts carried by said rotor disc on both sides at the edge thereof and extending over a part of the stator, stator contacts cooperating with said rotor contacts, each stator contact having a portion to which leads may be soldered and having a pair of jaws which are elastic and stressed for gripping the cooperating rotor contact on opposite sides thereof, a switch section comprising a stator and rotor being adapted to be assembled so that the rotor cannot be removed from the stator, at least one rotor contact having at least one radial extension for cooperating with certain stator contacts and said stator having at least one grounding stator contact bearing against the body of a rotor contact in all rotor positions, said rotor contact having an apertured part at the body, said apertured part being large enough and so disposed that said rotor may be turned, with respect to said stator, in a position so that the grounding stator contact jaws, which are normally sprung apart by the thickness of the rotor contact, can touch each other through the rotor contact aperture thereby relieving the strain in the contact jaws and preventing an undesirable set in the contact jaws during heating incident to soldering connections to said stator contacts.

2. The structure of claim 1 wherein said apertured rotor contact forms a complete ring.

EDWARD J. MASTNEY.

REFERENCES CITED

The following references are of record in the file of this patent:

UNITED STATES PATENTS

| Number | Name | Date |
|---|---|---|
| 2,186,950 | Allison et al. | Jan. 16, 1940 |
| 2,440,037 | Wolff et al. | Apr. 20, 1948 |
| 2,535,686 | Lawrence | Dec. 26, 1950 |